United States Patent
Offer et al.

(10) Patent No.: US 10,305,760 B2
(45) Date of Patent: May 28, 2019

(54) IDENTIFYING AN ANALYSIS REPORTING MESSAGE IN NETWORK TRAFFIC

(71) Applicant: ENTIT SOFTWARE LLC, Sunnyvale, CA (US)

(72) Inventors: Guy Offer, Yehud (IL); Michael Gopshtein, Yehud (IL); Eyal Kenigsberg, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 883 days.

(21) Appl. No.: 14/655,772

(22) PCT Filed: Jan. 3, 2013

(86) PCT No.: PCT/US2013/020039
§ 371 (c)(1),
(2) Date: Jun. 26, 2015

(87) PCT Pub. No.: WO2014/107147
PCT Pub. Date: Jul. 10, 2014

(65) Prior Publication Data
US 2015/0333985 A1    Nov. 19, 2015

(51) Int. Cl.
*H04L 12/26* (2006.01)
*H04L 29/08* (2006.01)

(52) U.S. Cl.
CPC .......... *H04L 43/062* (2013.01); *H04L 43/028* (2013.01); *H04L 43/04* (2013.01);
(Continued)

(58) Field of Classification Search
CPC ..... H04L 43/062; H04L 43/028; H04L 43/04; H04L 43/12; H04L 67/10; H04L 67/2809; H04L 67/02
See application file for complete search history.

(56) References Cited

U.S. PATENT DOCUMENTS 6,032,184 A * 2/2000 Cogger ............... G06F 11/0709
                                                707/999.01
6,173,322 B1 * 1/2001 Hu ......................... G06F 9/505
                                                709/217
(Continued)

FOREIGN PATENT DOCUMENTS

EP          2081356 A1     7/2009
JP      2001350688 A   * 12/2001
(Continued)

OTHER PUBLICATIONS

BMC Software, Inc., "BMC End User Experience Management," May 3, 2012, <http://web.archive.org/web/20120503203540/http://www.bmc.com/products/product-listing/end-user-experience.html>.

(Continued)

*Primary Examiner* — Kostas J Katsikis

(57) ABSTRACT

A non-transitory machine-readable storage medium encoded with instructions executable by a processing resource of a computing device to access network traffic exchanged with a web server application. The storage medium also identifies, in the accessed network traffic, an analysis reporting message of a client system and extracts, from the analysis reporting message, information representing a client system analysis of at least one prior transaction between the client system and a proxy server associated with the web server application. The information representing the client system analysis can comprise information describing an experience of the client system, including an indication of an amount of time to perform at least one prior transaction between the client system and the proxy server.

15 Claims, 5 Drawing Sheets

(52) U.S. Cl.
CPC .............. *H04L 43/12* (2013.01); *H04L 67/02* (2013.01); *H04L 67/10* (2013.01); *H04L 67/2809* (2013.01)

(56) References Cited

U.S. PATENT DOCUMENTS

| | | | | |
|---|---|---|---|---|
| 6,321,338 | B1* | 11/2001 | Porras | H04L 41/142 709/224 |
| 6,446,200 | B1* | 9/2002 | Ball | H04L 12/14 709/203 |
| 6,484,143 | B1 | 11/2002 | Swildens et al. | |
| 6,681,232 | B1* | 1/2004 | Sistanizadeh | H04L 41/0213 |
| 7,046,680 | B1* | 5/2006 | McDysan | H04L 45/308 370/395.21 |
| 7,353,272 | B2 | 1/2008 | Robertson et al. | |
| 7,447,736 | B2* | 11/2008 | Devine | G06F 11/0709 709/203 |
| 8,856,869 | B1* | 10/2014 | Brinskelle | H04L 63/08 726/12 |
| 9,021,021 | B2* | 4/2015 | Backholm | H04L 43/065 709/203 |
| 9,411,782 | B2* | 8/2016 | Harris | G06F 17/211 |
| 2002/0078371 | A1* | 6/2002 | Heilig | H04L 12/2856 726/4 |
| 2002/0087633 | A1* | 7/2002 | Nelson | H04L 67/306 709/204 |
| 2003/0149646 | A1* | 8/2003 | Chen | G06Q 40/00 705/35 |
| 2003/0163403 | A1* | 8/2003 | Chen | G06Q 40/06 705/36 R |
| 2003/0191703 | A1* | 10/2003 | Chen | G06Q 40/02 705/36 R |
| 2006/0239292 | A1* | 10/2006 | Kahana | H04W 74/02 370/437 |
| 2006/0259588 | A1* | 11/2006 | Lerman | G11B 27/034 709/219 |
| 2006/0271670 | A1* | 11/2006 | Blomquist | H04L 43/028 709/224 |
| 2007/0039049 | A1* | 2/2007 | Kupferman | G06F 11/3495 726/22 |
| 2007/0140131 | A1* | 6/2007 | Malloy | H04L 43/026 370/241 |
| 2007/0195733 | A1* | 8/2007 | Noh | H04W 76/10 370/331 |
| 2007/0220599 | A1* | 9/2007 | Moen | H04L 63/0227 726/12 |
| 2008/0065476 | A1* | 3/2008 | Klein | G06Q 30/02 705/14.13 |
| 2008/0130495 | A1* | 6/2008 | Dos Remedios | H04L 47/10 370/230 |
| 2009/0138427 | A1* | 5/2009 | Kalavade | G06Q 10/0637 |
| 2009/0219829 | A1 | 9/2009 | Merkey et al. | |
| 2010/0039957 | A1 | 2/2010 | Kotrla et al. | |
| 2010/0042573 | A1 | 2/2010 | Wenig et al. | |
| 2010/0325588 | A1 | 12/2010 | Reddy et al. | |
| 2011/0022701 | A1* | 1/2011 | Prescott | H04L 43/028 709/224 |
| 2011/0055386 | A1* | 3/2011 | Middleton | H04L 67/125 709/224 |
| 2011/0211593 | A1* | 9/2011 | Pepper | H04L 43/028 370/474 |
| 2011/0282995 | A1* | 11/2011 | Gass | G06F 8/65 709/226 |
| 2011/0283269 | A1* | 11/2011 | Gass | G06F 8/65 717/168 |
| 2011/0283270 | A1* | 11/2011 | Gass | G06F 8/65 717/168 |
| 2011/0296391 | A1* | 12/2011 | Gass | G06F 8/36 717/168 |
| 2011/0320870 | A1 | 12/2011 | Kenigsberg et al. | |
| 2012/0036105 | A1* | 2/2012 | Souza | H04N 7/17318 707/622 |
| 2012/0084605 | A1 | 4/2012 | Shilon et al. | |
| 2012/0096146 | A1* | 4/2012 | Barnett | H04L 41/147 709/224 |
| 2012/0230186 | A1* | 9/2012 | Lee | H04L 43/028 370/230 |
| 2012/0314616 | A1* | 12/2012 | Hong | H04L 43/028 370/253 |
| 2013/0159395 | A1* | 6/2013 | Backholm | H04L 43/065 709/203 |
| 2013/0173756 | A1* | 7/2013 | Luna | H04L 43/0876 709/219 |
| 2013/0212255 | A1* | 8/2013 | Chao | H04L 41/083 709/224 |
| 2013/0232251 | A1* | 9/2013 | Pauley | H04L 63/306 709/224 |
| 2013/0262655 | A1* | 10/2013 | Deschnes | H04L 63/0428 709/224 |
| 2013/0318238 | A1* | 11/2013 | Hall | H04L 43/028 709/224 |
| 2014/0075497 | A1* | 3/2014 | Luo | G06F 21/552 726/1 |
| 2014/0086073 | A1* | 3/2014 | Baykal | H04L 41/5038 370/252 |
| 2014/0089661 | A1* | 3/2014 | Mahadik | H04L 61/1511 713/162 |
| 2014/0169196 | A1* | 6/2014 | Kay | H04L 43/026 370/252 |
| 2015/0222683 | A1* | 8/2015 | Celona | H04L 67/42 709/206 |
| 2015/0341812 | A1* | 11/2015 | Dion | H04W 24/08 370/252 |
| 2017/0048104 | A1* | 2/2017 | Bartlett | H04L 45/306 |

FOREIGN PATENT DOCUMENTS

| | | | | |
|---|---|---|---|---|
| KR | 20090000028 | | 1/2009 | |
| WO | WO-0175727 | A1 * | 10/2001 | G06Q 10/087 |
| WO | WO-02084520 | A1 * | 10/2002 | G06Q 10/10 |
| WO | WO-2007019326 | A2 * | 2/2007 | G06Q 40/00 |

OTHER PUBLICATIONS

BMC Software, Inc., "BMC End User Experience Management—Overview," May 8, 2012, (Video image excerpts and voice-over transcript), <http://web.archive.org/web/20130107091108/http://www.bmc.com/products/euemondemand/euem-ondemand-demo/end-user-experience-management-overview.html>.

Amazon Web Services LLC, "Amazon CloudFront," retrieved Oct. 22, 2012, retrieved from: <http://aws.amazon.com/cloudfront/>.

BMC Software, Inc., "Akamai—A BMC Strategic Alliance Partner," retrieved Oct. 22, 2012, retrieved from: <http://www.bmc.com/partners/find-partneri/strategic-alliances/akamai-partnership.html>.

BMC Software, Inc., "BMC End User Experience Management OnDemand for Akamai Cloud," retrieved Oct. 22, 2012, retrieved from: <http://www.bmc.com/products/euem-ondemand/end-user-experience-management-on-demand-for-Akami-Coud.html>.

BMC Software, Inc., "BMC Software Delivers Industry's First Real-Time, Real-User management-as-a-Service Solution for Cloud Applications," Apr. 16, 2012, retrieved from: <http://www.bmc.com/news/press-releases/2012/BMC-Software-Delivers-Industrys-First-Real-Time-Real-User-Management-as-a-Service-Solution-for-Cloud-Applications.html>.

dbta.com, "BMC Ships 'Management-as-a-Service' Solution for Cloud," Apr. 30, 2012, dbta.com, retrieved from: <http://www.dbta.com/Articles/Editorial/News-Flashes/BMC-Ships-Management-as-a-Service-Solution-for-Cloud-82266.aspx>.

Effetech, "EffeTech HTTP Sniffer," retrieved Nov. 13, 2012, retrieved from: <http://www.effetech.com/sniffer/>.

International Searching Authority, International Search Report and Written Opinion, dated Oct. 11, 2013, 11 pages.

Kyle James, "Four Types of Web Analytic Data," Oct. 27, 2008, .eduGuru, retrieved from: <http://doteduguru.coml/id984-four-types-web-analytic-data.html>.

(56) References Cited

OTHER PUBLICATIONS wiki.nokernel.net, "HTTP Header Sniffer," Aug. 13, 2009, retrieved from: <http://wiki.nokernel.net/http-header-sniffer>.
Wikipedia, "Content delivery network," Oct. 5, 2012, retrieved from: <http://en.wikipedia.org/wiki/Content_delivery_network>.
Wikipedia, "Google Analytics," Oct. 30, 2012, retrieved Nov. 2, 2012, retrieved from: <http://en.wikipedia.org/wiki/Google_Analytics>.
Wikipedia, "Packet analyzer," Nov. 7, 2012, retrieved from: <http://en.wikipedia.org/wiki/Packet_analyzer>.
Wikipedia, "Passive monitoring," Sep. 18, 2012, retrieved from: <http://en.wikipedia.org/wiki/Passive_monitoring>.
Wikipedia, "Real user monitoring," Aug. 8, 2012, retrieved from: <http://en.wikipedia.org/wiki/Real_user_monitoring>.

\* cited by examiner

IDENTIFYING AN ANALYSIS REPORTING MESSAGE IN NETWORK TRAFFIC

BACKGROUND

A computer network may include a web server application accessible to a client system remote from the computer network. The web server application may, for example, implement a website accessible via a web browser of the client system, In some examples, the computer network may also include a traffic monitoring system to monitor network traffic exchanged with the web server application. In such examples, the performance of the web server application may be analyzed based on the monitored network traffic.

BRIEF DESCRIPTION OF THE DRAWINGS

The following detailed description references the drawings, wherein.

DETAILED DESCRIPTION

Figure 1:
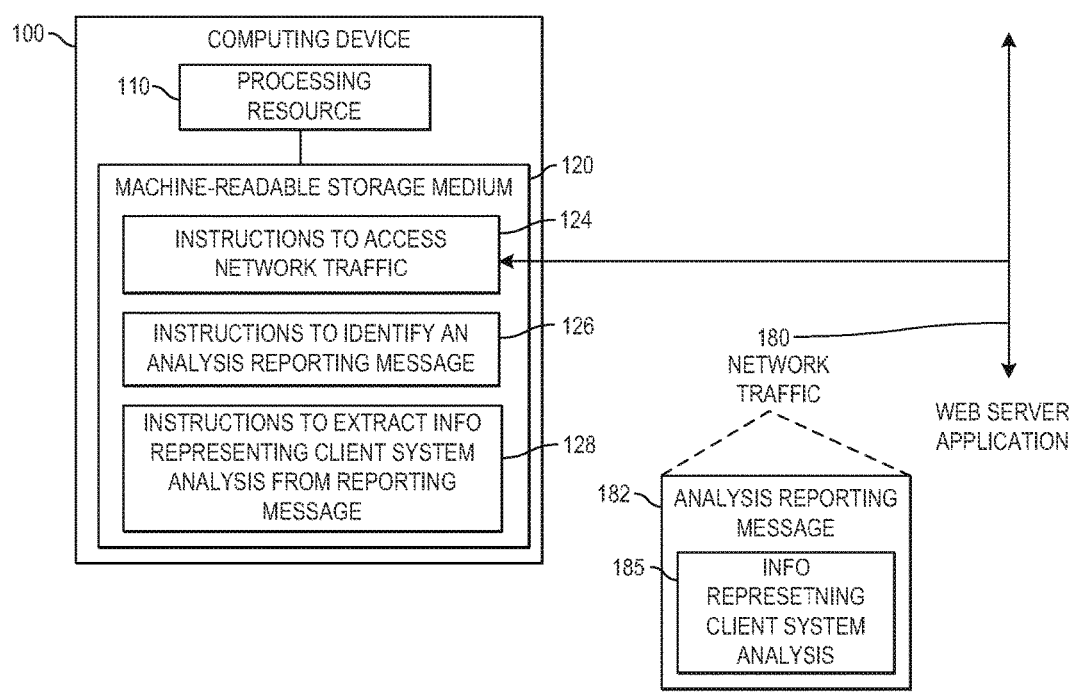
FIG. 1 is a block diagram of an example computing device to identify an analysis reporting message in accessed network traffic.

As noted above, a traffic monitoring system of a computer network may monitor network traffic exchanged with a web server application of the computer network. Such traffic monitoring may provide insights into aspects of the experience of a client system when interacting with the website. However, some or all of the content of a website implemented by the web server application may be provided to a client system by a proxy server, such as a server of a content delivery network (CDN). In such examples, the traffic monitoring system may not monitor the traffic between the proxy server and the client system, no the traffic monitoring system may not be able to monitor some aspects of the client system's experience in relation to the website via the traffic monitored by the system.

In some examples, a client system may track certain aspects of its experience interacting with the website and report this experience data to a server configured to receive the data. An entity operating the computer network may desire to utilize such client experience data in monitoring the performance of the website. However, the web server application may not be configured to receive the client experience data, and incorporating a monitoring application into the web server application to receive and utilize such data may be impractical since different types of applications such as these are often developed by different entities (e.g., companies).

As such, enabling the computer network to receive client experience data from a client system may involve deploying an additional server implementing an application to receive the client experience data for use in analyzing client experience. However, a process for deploying a new server in the computer network to run an application with ports open to receive client experience data from client systems may entail verification, by information technology (IT) personnel, of the security of the additional server and application. As such, deploying the new server and application may involve expending much IT personnel time and effort.

To address these issues, examples described herein may provide a traffic monitoring system to access network traffic exchanged with a web server application and identify, in the accessed network traffic, an analysis reporting message of a client system. In some examples, the traffic monitoring system may extract, from the analysis reporting message, information representing a client system analysis of at least one prior transaction between the client system and at least one of the web server application and a proxy server associated with the web server application. In some examples described herein, the traffic monitoring system may identify, as the analysis reporting message, a message in the accessed network traffic sent to an analysis reporting uniform resource locator (URL) of the web server application.

In this manner, examples described herein may enable an entity to receive analysis reporting messages from client systems without deploying an additional server with ports open to receive the messages and without substantial modifications to the web server application. For example, in examples described herein, the web server application, which already has verified ports open to receive messages from client systems, may be configured to receive analysis reporting messages from client systems and acknowledge those messages, without any further processing by the web server application. Such minor configuration of the web server application may be done without substantial development efforts. Moreover, in examples described herein, a traffic monitoring system may access (e.g., via traffic sniffing) the analysis reporting messages sent by client systems to the web server application, and process those messages (e.g., to obtain information representing client system analyses) separately from the web server application.

Referring now to the drawings, FIG. 1 is a block diagram of an example computing device 100 to identify an analysis reporting message 182 in accessed network traffic 180. As used herein, a "computing device" may be a server, computer networking device, chip set, desktop computer, notebook computer, workstation, or any other processing device or equipment. In the example of FIG. 1, computing device 100 includes a processing resource 110 and a machine-readable storage medium 120 encoded with instructions 124, 126, and 128. In some examples, storage medium 120 may include additional instructions. In other examples, instructions 124, 126, 128, and any other instructions described herein in relation to storage medium 120 may be stored on a machine-readable storage medium remote from but accessible to computing device 100 and processing resource 110.

In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to implement the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. Further, any machine-readable storage medium described herein may be non-transitory.

In some examples, computing device 100 may implement at least a portion of a traffic monitoring system to monitor traffic exchanged with a web server application. In some examples, instructions 124, 126, 128 may be part of a larger set of instructions implementing a monitoring probe of the traffic monitoring system. In some examples, the monitoring probe and the web server application may be implemented on different computing devices. For example, computing device 100 may be a server implementing the monitoring probe (at least in part). In such examples, computing device 100 may monitor traffic exchanged with at least one server, separate from computing device 100, implementing the web server application. In other examples, computing device 100 may implement both the monitoring probe and the web server application. In such examples, computing device 100 may be a server, for example.

In some examples, a web server application may be an application, implemented by at least one server, that may receive and respond to requests from a remote client system. In some examples, the web server application may implement a website and may respond to requests targeting uniform resource locators (URLs) associated with the website. Also, while some examples are described herein in the context of a traffic monitoring system, examples described herein may be utilized in or with any other suitable system.

In the example of FIG. 1, instructions 124 may access network traffic 180 exchanged with a web server application. In some examples, network traffic 180 may include network traffic exchanged between the web server application and client systems, proxy servers, any other server or system in communication with the web server application, or a combination thereof. Instructions 124 may access network traffic 180 by actively or passively acquiring the network traffic 180, by reading or examining the network traffic 180 with or without acquiring the traffic, or the like. In some examples, instructions 124 may access network traffic 130 by sniffing network traffic 180 exchanged with the web server application. In such examples, the sniffing may include packet sniffing.

As noted above, in some examples, the web server application may be implemented on a server separate from computing device 100. In such examples, instructions 124 may sniff or otherwise access network traffic 130 from a network switch through which network traffic 180 is exchanged between the web server application and other systems (e.g., client systems, etc.). In such examples, the network switch may provide instructions 124 with copies of network traffic 180 exchanged with the web server application. In other examples, the monitoring probe (e.g., including instructions 124, 126, and 128) and the web server application may both be implemented by computing device 100. In such examples, instructions 124 may sniff or otherwise access traffic 180 from a network interface (e.g., a network interface controller (NIC)) of computing device 100 used by the web server application to exchange network traffic 180 with other systems (e.g., client systems, etc.).

In the example of FIG. 1, instructions 126 may identify, in accessed network traffic 180, an analysis reporting message 182 of a client system. In such examples, network traffic 180 may include a plurality of messages, and instructions 126 may identify an analysis reporting message 182 of a client system among them. In some examples, the pages of a website implemented by the web server application may include executable instructions that, when executed by the web browser of a client system, may cause the client system to generate information representing a client system analysis of at least one transaction between the client system and a web server application implementing the website, a proxy server associated with the web server application, or a combination thereof. In some examples, the generation of the information representing the client system analysis may comprise performing the client system analysis with the client system. In some examples, the executable instructions may be implemented in the form of JavaScript code or the like.

In examples described herein, an analysis reporting message may be a message including information representing a client system analysis of any type of prior transaction between a client system and at least one server. Such a prior transaction may include one message or a plurality of messages exchanged between the client system and at least one server prior to generation of the analysis reporting message. For example, a prior transaction may include downloading a web page to a client system, any other type of interaction with a website (e.g., purchasing an item, etc.), sending or receiving an e-mail, logging in to a remote system with a client system, or the like. In examples described herein, an analysis reporting message including information representing a client system analysis is not a part of the transaction described by the information representing the client system analysis. Rather, as described herein, the analysis reporting message includes descriptive information describing at least one aspect of a prior transaction.

As used herein, a "client system analysis" of a transaction between a client system and at least one server is an analysis of the transaction performed by the client system. In examples described herein, information representing a client system analysis of a transaction between a client system and at least one server may include information describing at least one result of the client system analysis of the transaction. For example, information representing a client system analysis of a transaction between a client system and at least one server may include information describing an experience of the client system in relation to the at least one transaction, describing the subject matter of the at least one transaction, or a combination thereof. In some examples, information representing a client system analysis may be generated by the client system that performed the analysis. Also, in some examples, the transaction with at least one server may include at least one transaction between the client system and at least one of a web server application and at least one proxy server associated with the web server application. As used herein, a proxy server associated with a web server application may be a server to cache content for the web server application. For example, the proxy server may cache content of a website implemented by the web server application and may provide the cached content to client systems in response to requests from the client systems. In some examples, the proxy server may include a server of a CDN. In some examples, the generation, by a client system, of information representing a client system analysis of at least one transaction with at least one server may comprise performing the client system analysis of the transaction. In such examples, performing the client system analysis may include at least one of collecting information regarding the transaction, and processing the collected information.

In examples described herein, information describing an experience of a client system in relation to a transaction between the client system and at least one server may include, for example, an indication of an amount of time taken to complete the transaction (as measured by the client system), the size of the transaction (e.g., the size of one or more components downloaded in the transaction), the number of web page components downloaded in a transaction to download a web page, a response code returned to the client system (e.g., indicating whether the requested content was available or not), and the like. In examples described herein, information describing the subject matter of a transaction may include, for example, a URL used by the client system in a transaction with a web page (such as downloading a web page, or performing a login), or subject matter of other types of web page interactions, such as, for example, the name of a product ordered via an interaction with the web page, or an e-mail address to or from which an e-mail was sent, or the like.

In some examples, the executable instructions of the website may also, when executed, cause the client system to provide the analysis reporting message to an analysis reporting URL of the web server application. For example, the executable instructions may cause the client system to generate the analysis reporting message including information representing a client system analysis of a transaction, and provide the analysis reporting message to the analysis reporting URL. In such examples, the web server application may be configured to receive and acknowledge messages sent to the analysis reporting URL, without performing any further processing of such messages. In such examples, instructions 126 may identify, as the analysis reporting message 182, a message in accessed network traffic 180 that is sent to the analysis reporting URL of the web server application. In some examples, instructions 126 may identify each message in accessed network traffic 180 that is sent to the analysis reporting URL as an analysis reporting message.

In the example of FIG. 1, instructions 128 may extract, from analysis reporting message 182, information 185 representing a client system analysis of at least one prior transaction between the client system and at least one of the web server application and a proxy server associated with the web server application. As used herein, information representing a client system analysis of a "prior transaction" included in an analysis reporting message is information representing a client system analysis of a transaction that occurred prior to the generation of the analysis reporting message.

As an example, the prior transaction may include downloading content of a website implemented by the web server application. In such examples, the transaction may include the client system requesting the website content (e.g., requesting a page of the website) and the web server application providing the content (e.g., the requested page). The client system may request and receive the website content from the web server application, or from a proxy server having the website content cached. In such examples, the information representing the client system analysis may, for example, include information indicating an amount of time taken to download all components of the web page, as measured by the client system. In other examples, the information representing the client system analysis may include information indicating respective amounts of time taken to download at least one individual component of the web page at the client system, such as at least one component of the web page.

In other examples, the analysis reporting message may include information representing a client system analysis of a plurality of prior transactions. For example, a client system may request portions of a web page of a website from a web server application implementing the website, and request certain content of the web page from a proxy server (e.g., a server of a CDN). The client system may receive portions of the web page from the web server application and other portions from the proxy server. In such examples, the analysis reporting message may include information representing a client system analysis of the plurality of transactions. In such examples, the information representing the client system analysis may include information indicating an amount of time taken to download all components of the web page from the different sources, as measured by the client system. In other examples, the information representing the client system analysis may include information indicating respective amounts of time taken to download individual components of the web page at the client system from at least one of the different sources.

In some examples, instructions 124, 126, and 128 may be part of an installation package that, when installed, may be executed by processing resource 110 to implement the functionalities described herein in relation to instructions 124, 126, and 128. In such examples, storage medium 120 may be a portable medium, such as a CD, DVD, or flash drive, or a memory maintained by a server from which the installation package can be downloaded and installed. In other examples, instructions 124, 126, and 128 may be part of an application or applications already installed on computing device 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-5.

Figure 2:
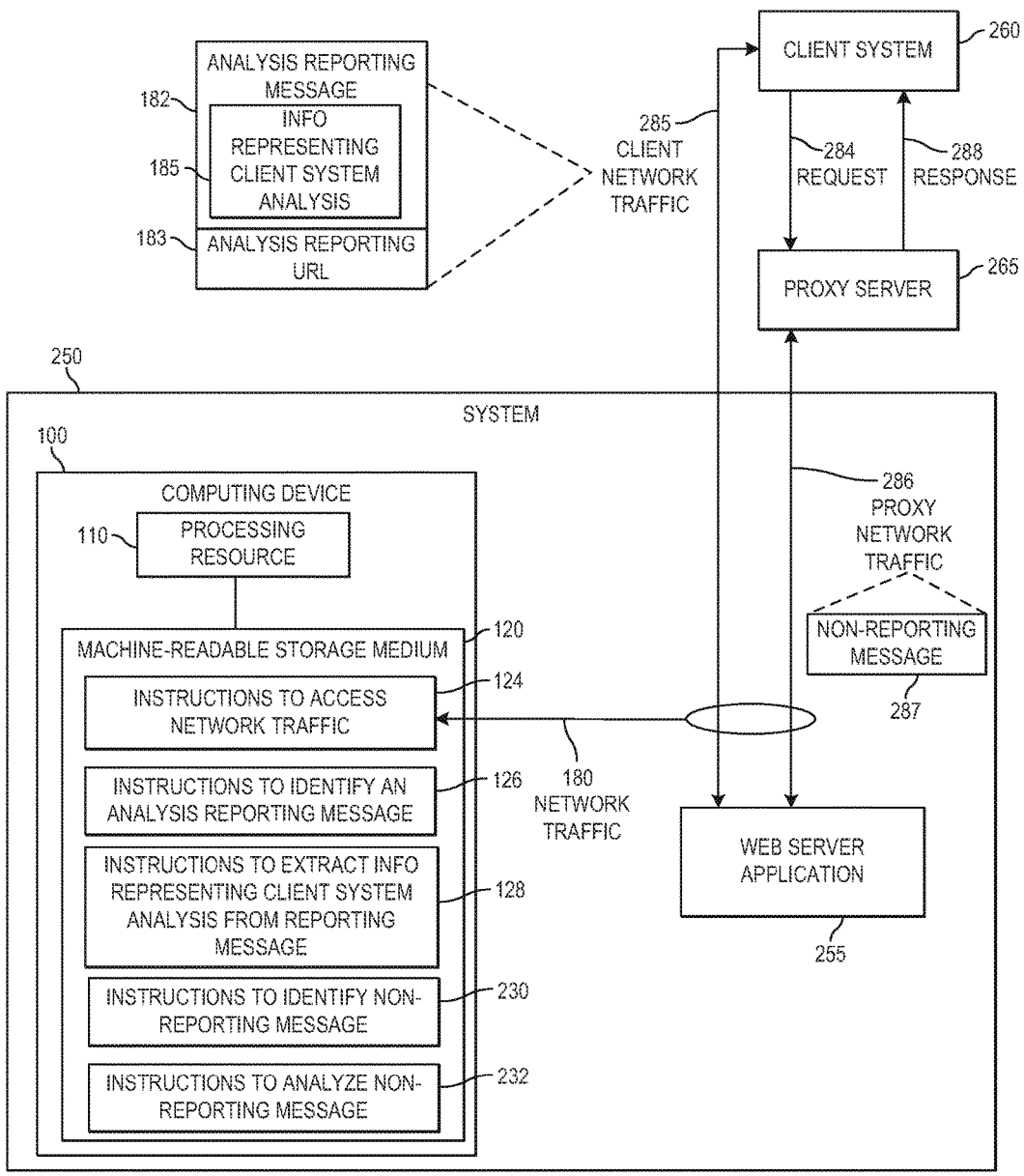
FIG. 2 is a block diagram of an example computing device to extract information representing a client system analysis from an analysis reporting message.

FIG. 2 is a block diagram of an example computing device 100 to extract information representing a client system analysis from an analysis reporting message. In the example of FIG. 2, a system 250 may include a computing device 100, as described above in relation to FIG. 1. For example, computing device 100 may include processing resource 110, and a storage medium 120 including instructions 124, 126, and 128, as described above in relation to FIG. 1. In the example of FIG. 2, storage medium 120 may also include instructions 230 and 232. In some examples, storage medium 120 may include additional instructions. In other examples, instructions 124, 126, 128, 230, 232 and any other instructions described herein in relation to storage medium 120 may be stored on a machine-readable storage medium remote from hut accessible to computing device 100 and processing resource 110.

In the example of FIG. 2, system 250 may also include a web server application 255. In some examples, web server application 255 may be implemented by a computing device (e.g., a server) separate from computing device 100. In other examples, web server application 255 may be implemented on computing device 100, including instructions 124, 126, 128, 230, and 232. In some examples, system 250 may comprise at least a portion of a computer network of an enterprise from which the enterprise may host a website for the enterprise. In such examples, the website may be implemented by web server application 255.

As described above in relation to FIG. 1, instructions 124 may access network traffic 180 exchanged with web server application 255. In the example of FIG. 2, network traffic 180 may include client network traffic 285 exchanged between web server application 255 and a client system 260, and proxy network traffic 286 exchanged between web server application 255 and a proxy server 265. In some examples, client system 260 may include a computing device having a web browser to interact with web server application 255. Proxy server 265 may be a computing device (e.g., a server) associated with web server application 255 to cache content of at least one website implemented by web server application 255. In some examples, web server application 255 may exchange client network traffic 285 with a plurality of client systems 260, and may exchange proxy network traffic 286 with a plurality of proxy servers 265.

In the example of FIG. 2, client network traffic 285 provided from client system 260 to web server application 255 may include an analysis reporting message 182. As described above in relation to FIG. 1, instructions 126 may identify, in the accessed network traffic 180, an analysis reporting message 182 of client system 260. In the example of FIG. 2, analysis reporting message 182 may be sent to an analysis reporting URL 183 defined at web server application 255, as described above in relation to FIG. 1. In such examples, instructions 126 may identify, as the analysis reporting message 182, a message in the accessed network traffic 180 sent to analysis reporting URL 183 of web server application 255. In some examples, analysis reporting message 182 may include at least a portion of analysis reporting URL 133. In some examples, analysis reporting message 182 may include a portion of analysis reporting URL 133 from which instructions 126 may identify that the analysis reporting message 182 is sent to analysis reporting URL 183. For example, analysis reporting message 182 may include at least a path portion of analysis reporting URL 183 that follows a domain name portion of analysis reporting URL 183.

As described above in relation to FIG. 1, instructions 128 may extract, from the identified analysis reporting message 182, information 185 representing a client system analysis of at least one prior transaction between client system 260 and at least one of web server application 255 and proxy server 265 associated with web server application 255. In such examples, analysis reporting message 182 may include information 185. In some examples, client system 260 may provide a plurality of different analysis reporting messages 182 to web server application 255 in client network traffic 285. In such examples, instructions 126 may identify each of the analysis reporting messages 182 and instructions 128 may extract information 185 representing a respective client system analysis of a transaction from each of the analysis reporting messages 182. In such examples, the information 185 in each of the messages 132 may represent a client system analysis of a different transaction (or transactions) between the client system and at least one of the web server application and a proxy server associated with the web server application. In some examples, web server application 255 may be configured to receive and acknowledge each of the plurality of analysis reporting messages 182, without any further processing of the analysis reporting messages 132 by web server application 255.

As noted above, analysis reporting message 102 may include information 185 representing client system analysis of at least one prior transaction between client system 260 and at least one of web server application 255 and proxy server 265. In some examples, the prior transaction may include at least one prior transaction between client system 260 and proxy server 265. In such examples, information 185 may comprise information describing an experience of client system 260 in relation to the prior transaction between client system 260 and proxy server 265. In some examples, the information describing the experience of client system 260 may include an indication of an amount of time taken by the prior transaction between client system 260 and proxy server 265. In other examples, information 185 may include other information describing an experience of client system 260 in relation to the prior transaction, information describing subject matter of the prior transaction, or a combination thereof.

In the example of FIG. 2, the prior transaction may include a request 284 from client system 260 to proxy server 265 and a response 288 from proxy server 265 to client system 260. In some examples, proxy server 265 may respond to request 284 with response 288 based on information cached at proxy server 265, without consulting web server application 255. In other examples, in response to request 284, proxy server 265 may communicate with web server application 255 (e.g., via proxy network traffic 286) to retrieve information for forming a response to request 284. In such examples, after receiving the appropriate information, proxy server may generate and provide response 288 to client system 260.

After receiving response 288, completing the transaction begun by request 284, client system 260 may generate analysis reporting message 182, including information 185 representing a client system analysis of the prior transaction begun by request 284 and completed by response 288. Information 185 may include, for example, an indication of an amount of time taken by the prior transaction defined by request 284 and response 288. In such examples, client system 260 may provide the analysis reporting message 182 to analysis reporting URL 183 of web server application 255. In such examples, as described above, instructions 124 may access the message 182 among network traffic 180, instructions 126 may identify the message 182, sent to analysis reporting URL 183, as an analysis reporting message 182, and instructions 128 may extract information 185.

In some examples, the prior transaction between client system 260 and proxy server 265 may comprise downloading, from proxy server 265 to client system 260, content of a website implemented by web server application 255, where the content is cached at proxy server 265. In such examples, the transaction may include a request 284 from client system 260 to proxy server 265 requesting the content of the website. In some examples, the request 284 may be a request for all components of a page of the website. In other examples, the request 284 may be a request for certain components of a page of the website. In response, proxy server 265 may respond to client system 260 with a response 288 including the requested content.

In such examples, after receiving response 288 completing the transaction begun by request 284, client system may generate analysis reporting message 182, including information 185 representing a client system analysis of the prior transaction begun by request 284 and completed by response 288. Information 185 may include, for example, information describing the experience of client system 260 in relation to the prior transaction, such as an indication of an amount of time taken to download the content from proxy server 265 to client system 260. In such examples, client system 260 may provide the analysis reporting message 182 to analysis reporting URL 183 of web server application 255.

In the example of FIG. 2, instructions 230 may identify another message in accessed network traffic 180, sent to another URL of web server application 255, as a non-reporting message. As used herein, a "non-reporting message" is any message of network traffic exchanged with a web server application, other than an analysis reporting message. For example, any message requesting website content or other resources or operations of web server application 255, or providing a response to such a request may be considered a non-reporting message. In some examples, client systems and proxy servers may provide analysis reporting messages to analysis reporting URL 183, while all other traffic may be provided to other URLs of web server application 255.

In such examples, instructions 230 may identify, as a non-reporting message, any message sent to a URL of web server application 255 other than analysis reporting URL 183. For example, in the example of FIG. 2, instructions 230 may identify, among network traffic 180, a message sent to a URL other than analysis reporting URL 183 as a non-reporting message 287. In some examples, instructions 232 may analyze the non-reporting message 287 in relation to other messages of the accessed network traffic 180 to generate information representing a network traffic analysis. In examples described herein, a network traffic analysis may include an analysis of at least one transaction with a web server application based on at least one message (e.g., request, response) of the transaction. In examples described herein, information representing a network traffic analysis may include information describing at least one result of the network traffic analysis. In the example of FIG. 2, instructions 232 may analyze non-reporting messages to generate information representing a network traffic analysis. For example, instructions 232 may determine an amount of time taken by a transaction to acquire a resource from web server application 255 by comparing the time of a request (i.e., a non-reporting message) for the resource sent to web server application 255 to the time of a response (i.e., a non-reporting message) of web server application 255 providing the resource. In other examples, instructions 232 may also generate information representing a network traffic analysis for other types of transactions based on accessed non-reporting messages.

In some examples, instructions 124, 126, 128, 230, 232 and any other instructions of storage medium 120 may be part of an installation package that, when installed, may be executed by processing resource 110 to implement the functionalities described herein in relation to instructions 124, 126, 128, 230, and 232. In such examples, storage medium 120 may be a portable medium, such as a CD, DVD, or flash drive, or a memory maintained by a server from which the installation package can be downloaded and installed. In other examples, instructions 124, 126, 123, 230, and 232 may be part of an application or applications already installed on computing device 100 including processing resource 110. In such examples, the storage medium 120 may include memory such as a hard drive, solid state drive, or the like. In some examples, functionalities described herein in relation to FIG. 2 may be provided in combination with functionalities described herein in relation to any of FIGS. 1 and 3-5.

Figure 3:
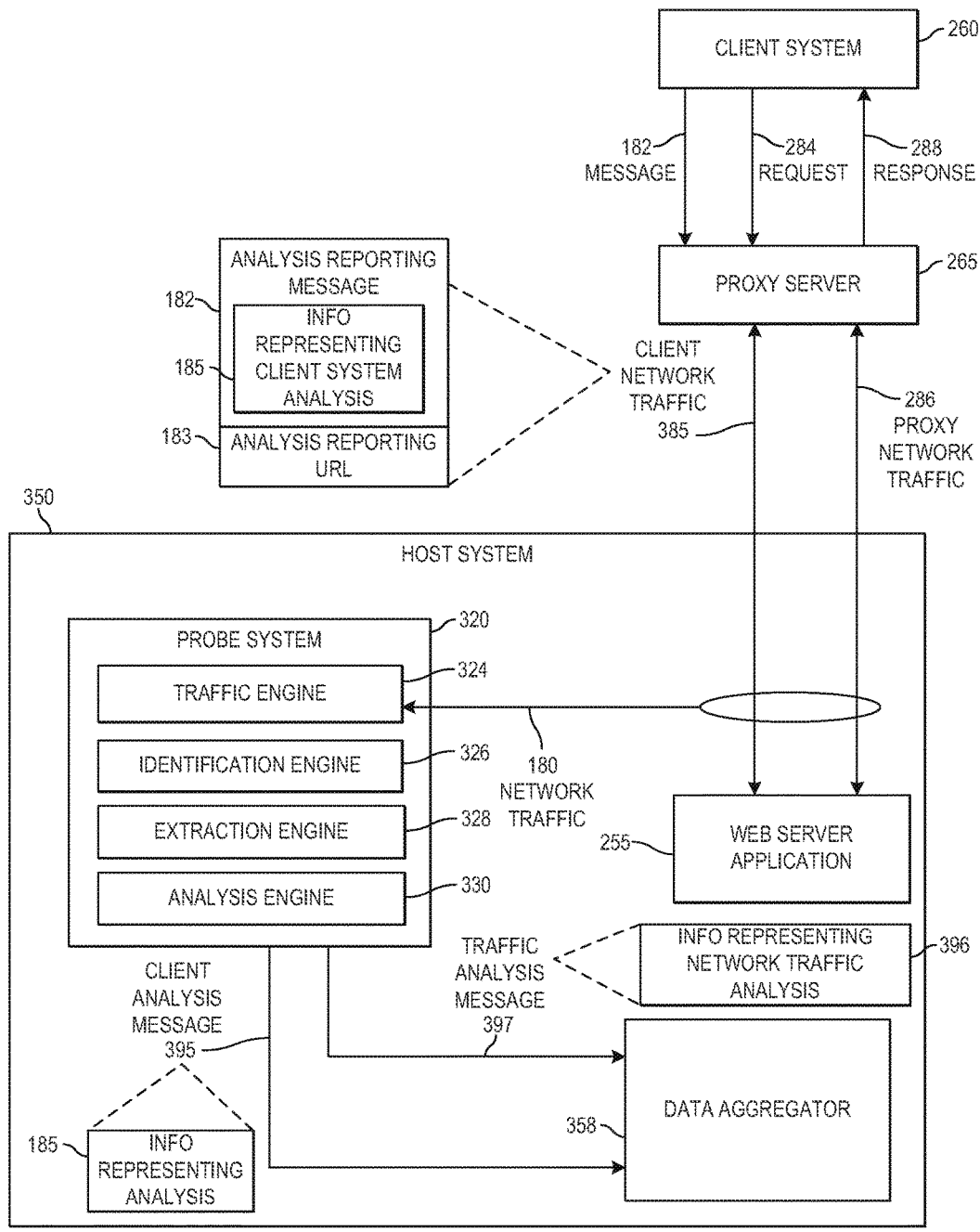
FIG. 3 is a block diagram of an example system to identify a message sent to an analysis reporting uniform resource locator (URL) as an analysis reporting message.

FIG. 3 is a block diagram of an example system 320 to identify a message sent to an analysis reporting URL as an analysis reporting message, In the example of FIG. 3, a host system 350 includes a web server application 255, as described above in relation to FIG. 2, in communication with a proxy server 265 and a client system 260, each as described above in relation to FIG. 2. Host system 350 also includes a data aggregator 358 and a probe system 320 including engines 324, 326, 328, and 330. In some examples, system 320 may include additional engines.

Each of engines 324, 326, 328, and 330, and any other engines of system 320, may be any combination of hardware and programming to implement the functionalities of the respective engine, Such combinations of hardware and programming may be implemented in a number of different ways. For example, the programming may be processor executable instructions stored on a non-transitory machine-readable storage medium and the hardware may include a processing resource to execute those instructions. In such examples, the machine-readable storage medium may store instructions that, when executed by the processing resource, implement system 320. The machine-readable storage medium storing the instructions may be integrated in the same computing device as the processing resource to execute the instructions, or the machine-readable storage medium may be separate but accessible to the computing device and the processing resource. The processing resource may be one processor or multiple processors included in a single computing device or distributed across multiple computing devices.

In some examples, the instructions can be part of an installation package that, when installed, can be executed by the processing resource to implement system 320. In such examples, the machine-readable storage medium may be a portable medium, such as a CD, DVD, or flash drive, or a memory maintained by a server from which the installation package can be downloaded and installed. In other examples, the instructions may be part of an application or applications already installed on a computing device including the processing resource. In such examples, the machine-readable storage medium may include memory such as a hard drive, solid state drive, or the like.

In the example of FIG. 3, traffic engine 324 may access network traffic 180 exchanged with web server application 255. Engine 324 may access network traffic exchanged with a web server application as described above in relation to FIG. 1. In some examples, network traffic 180 may include proxy network traffic 286 and client network traffic 385, each exchanged between proxy server 265 and web server application 255. In such examples, proxy network traffic 286 may include traffic generated by proxy server 265 and responses to that traffic, and client network traffic 385 may include traffic generated by client system 260 and provided to web server application 255 via proxy server 265 and responses to that traffic. In other examples, network traffic 180 may also include network traffic exchanged between client system 260 and web server application 255 independent of proxy server 265. In some examples, probe system 320 and web server application 255 may be implemented on the same computing device (e.g., the same server, etc.). In other examples, probe system 320 and web server application 255 may be implemented on different computing devices (e.g., different servers).

In some examples, identification engine 326 may identify, as an analysis reporting message 182 of client system 260, a message in the accessed network traffic 180 sent to an analysis reporting URL 183 of web server application 255, as described above in relation to FIGS. 1-2. In the example of FIG. 3, extraction engine 328 may extract, from the analysis reporting message 182, information 185 representing a client system analysis of at least one prior transaction associated with a request of the client system targeting URL of web server application 255 different than analysis reporting URL 183. In such examples, the at least one prior transaction may be a transaction initiated by a request sent by client system 260 and targeting a URL other than analysis reporting URL 183. As used herein, a request "targeting" a given URL is a request sent by a client system and specifying, by the given URL, a resource that is the subject of the request. In examples described herein, a client system request targeting a given URL of a web server application may be received and processed by the web server application or may be received and processed by a proxy server associated with the web server application. In such examples, a request specifying a given URL of a web server application and that is processed partially or completely by a proxy server associated with the web server application may be considered a request targeting the given URL of the web server application.

In the example of FIG. 3, the prior transaction may include a prior transaction between client system 260 and proxy server 265 associated with web server application 255. In such examples, client system 260 may provide a request 284, targeting a URL other than analysis reporting URL 183, to proxy server 265. In some examples, proxy server 265 may process request 284 and provide a response 288 to client system 260 (e.g., a response including requested content). In other examples, proxy server 265 may forward request 284 to web server application 255 for processing and receive a response via client network traffic 385. In other examples, proxy server 265 may be capable of a partial response to the request, and may generate a new request targeting web server application 255 to complete the response. In such examples, proxy server 265 may acquire certain content from web server application 255 and use this information to formulate its response 288 to request 284.

In the example of FIG. 3, after receiving response 288, client system 260 may generate information 185 representing a client system analysis of the prior transaction beginning with request 284 and completed by response 288, where request 284 is a request targeting a URL of web server application 255 other than the analysis reporting URL. Client system 260 may then generate an analysis reporting message 182 including the information 185 and targeting the analysis reporting URL 183 of web server application 255. For example, client system 260 may provide the message 182 to the analysis reporting URL 183. In some examples, the information 185 may include information describing the subject matter of the prior transaction. In other examples, the information 185 may describe an experience of the client system in relation to the prior transaction.

In the example of FIG. 3, client system 260 may provide message 182 to web server application 255 via proxy server 265, In such examples, message 182 may be provided to web server application 255 via client network traffic 385, and identification engine 326 may identify the analysis reporting message 182 in accessed network traffic 180 exchanged between web server application 255 and proxy server 265 (e.g., client network traffic 385). In other examples, client system 260 may provide analysis reporting message 182 to web server application 255 without providing the message through proxy server 265. In some examples, analysis reporting message 182 may include information 185 representing a client system analysis and at least a portion of analysis reporting URL 183. In some examples, proxy server 265 may be at least one server of a CDN.

In the example of FIG. 3, analysis engine 330 may provide the extracted information 185 to a data aggregator 358 in a client system analysis message 395. In some examples, client system 260 may provide a plurality of different analysis reporting messages 182 to web server application 255 in client network traffic 385. In such examples, identification engine 326 may identify each of the analysis reporting messages 182 and engine 328 may extract information 185 representing a respective client system analysis from each of the analysis reporting messages 182. In such examples, each the information 185 in each of the messages 182 may be information representing a client system analysis of a different transaction (or transactions) associated with a request targeting a URL of web server application 255, other than the analysis reporting URL 183. As described above, web server application 255 may be configured to receive and acknowledge each of the plurality of analysis reporting messages 182, without any further processing of the analysis reporting messages 182 by web server application 255. In some examples, analysis engine 330 may provide the information 185 extracted from each of the messages 182 to data aggregator 358 in client system analysis messages 395.

In the example of FIG. 3, identification engine 326 may further identify messages in the accessed network traffic 180 sent to URLs of web server application 255, other than analysis reporting URL 183, as a non-reporting messages. In such examples, analysis engine 330 may analyze each of the non-reporting messages in relation to other non-reporting messages of accessed network traffic 180 to generate information 396 representing a network traffic analysis. Analysis engine 330 may provide information 396 representing a network traffic analysis that it generates to data aggregator 358 in traffic analysis messages 397.

In some examples, data aggregator 358 may store information received from probe system 320, such as information 185 and information 396, and may process the information to generate reports, statistical information (e.g., the average amount of time taken by a request targeting a particular URL), and the like. In some examples, data aggregator 358 may be implemented on a computing device (e.g., a server) separate from a computing device (or devices) implementing probe system 320. In some examples, probe system 320 and data aggregator 358 may each be components of a traffic monitoring system. In such examples, the traffic monitoring system may include other probe systems also providing analysis data to data aggregator 358. In some examples, functionalities described herein in relation to FIG. 3 may be provided in combination with functionalities described herein in relation to any of FIGS. 1-2 and 4-5.

Figure 4:
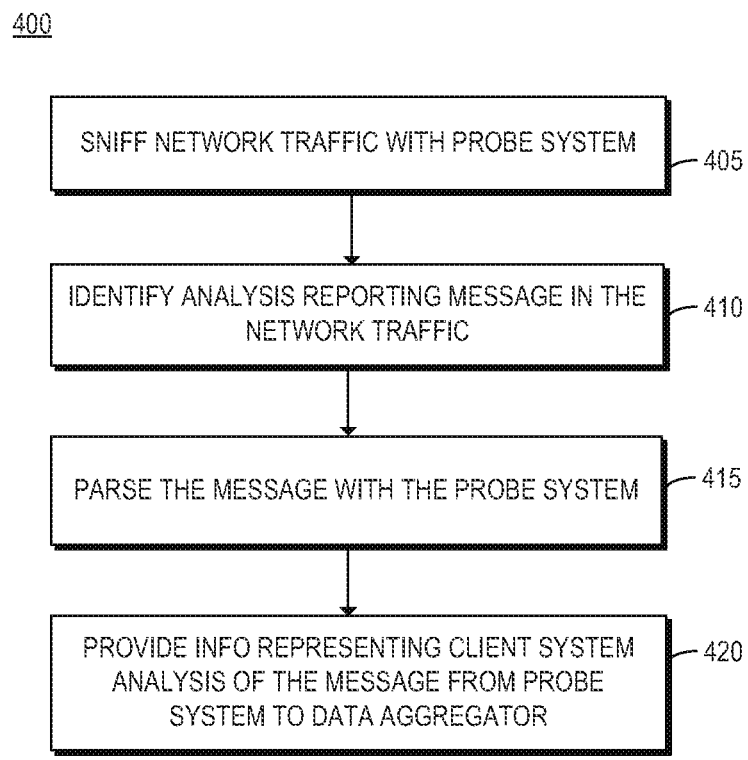
FIG. 4 is a flowchart of an example method for providing information representing a client system analysis of an analysis reporting message to a data aggregator.

FIG. 4 is a flowchart of an example method 400 for providing information representing a client system analysis of an analysis reporting message to a data aggregator. Although execution of method 400 is described below with reference to system 320 of FIG. 3, other suitable systems for execution of method 400 can be utilized (e.g., computing device 100). Additionally, implementation of method 400 is not limited to such examples.

At 405 of method 400, probe system 320 may sniff network traffic 180 exchanged with web server application 255. For example, traffic engine 324 of probe system 320 may access network traffic 180 via sniffing (e.g., packet sniffing), as described above in relation to FIG. 1. At 410, identification engine 326 may identify, in network traffic 180, an analysis reporting message 182 of a client system 260. For example, engine 326 may identify a message in network traffic 180 as an analysis reporting message 182 if the message is targeting an analysis reporting URL 183 of web server application 255.

At 415, extraction engine 328 of probe system 320 may parse the identified analysis reporting message 182. In some examples, the analysis reporting message 182 may include information 185 representing a client system analysis of at least one prior transaction between client system 260 and at least one of web server application 255 and a proxy server 265 associated with web server application 255. At 420, extraction engine 330 of probe system 320 may provide the information 185, included in the parsed analysis reporting message 182, from probe system 320 to a data aggregator 358.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3 and 5.

Figure 5:
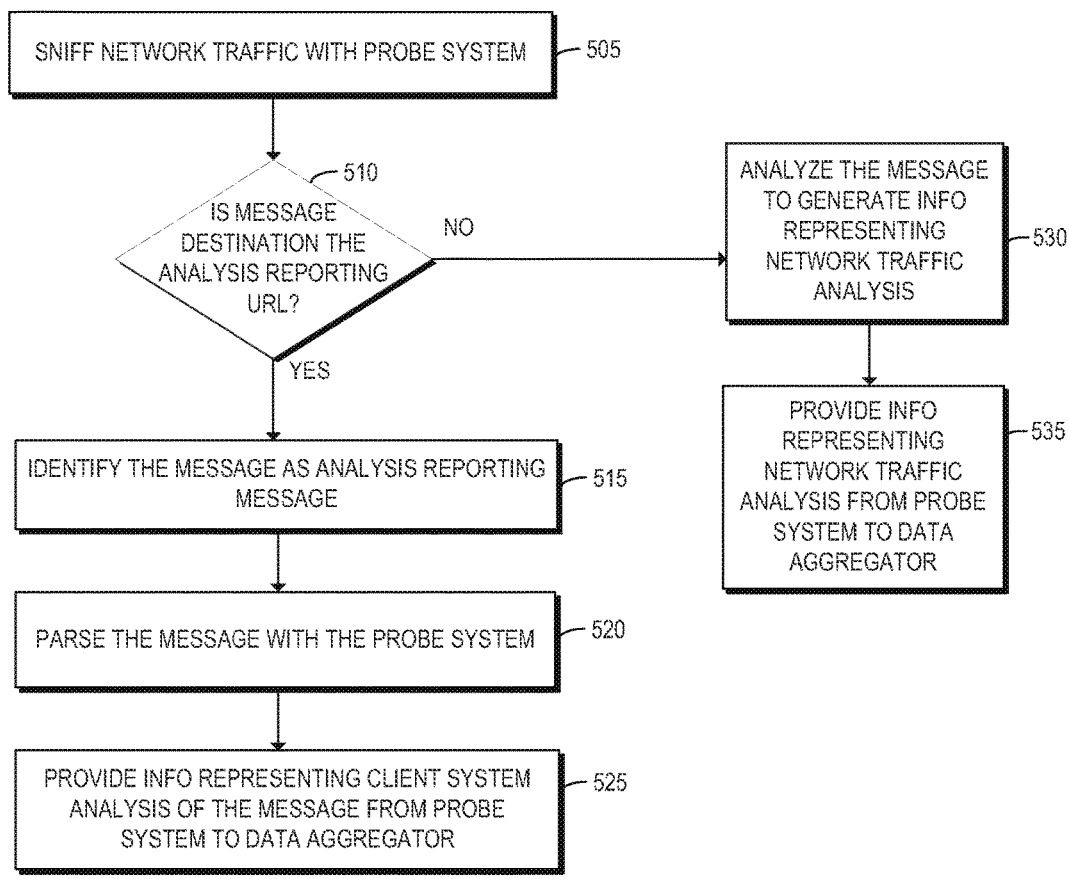
FIG. 5 is a flowchart of an example method for identifying, as an analysis reporting message, a message targeting an analysis reporting URL.

FIG. 5 is a flowchart of an example method 500 for identifying, as an analysis reporting message, a message targeting an analysis reporting URL. Although execution of method 500 is described below with reference to system 320 of FIG. 3, other suitable systems for execution of method 500 can be utilized (e.g., computing device 100). Additionally, implementation of method 500 is not limited to such examples.

At 505 of method 500, probe system 320 may sniff network traffic 180 exchanged with web server application 255. At 510, identification engine 326 may determine whether a message in network traffic 180 is targeting an analysis reporting URL 183 of web server application 255. If engine 326 determines that the message is targeting the analysis reporting URL 183, then method 500 may proceed to 515, where engine 326 may identify the message of network traffic 180 as an analysis reporting message 182 of a client system 260.

At 520, extraction engine 328 of probe system 320 may parse the identified analysis reporting message 182. In some examples, the analysis reporting message 182 may include information 185 representing a client system analysis of at least one prior transaction between client system 260 and at least one of web server application 255 and a proxy server 265 associated with web server application 255. At 525, extraction engine 330 of probe system 320 may provide the information 185, included in the parsed analysis reporting message 182, from probe system 320 to a data aggregator 358.

If engine 326 determines at 510 that the message of network traffic 180 is not targeting the analysis reporting URL 183, then method 500 may proceed to 530, where analysis engine 330 may analyze the message in association with other messages of network traffic 180 to generate information 396 representing a network traffic analysis. Method 500 may then proceed to 535, where analysis engine 330 may provide the information 396 representing the network traffic analysis from probe system 320 to data aggregator 358.

Although the flowchart of FIG. 5 shows a specific order of performance of certain functionalities, method 500 is not limited to that order. For example, the functionalities shown in succession in the flowchart may be performed in a different order, may be executed concurrently or with partial concurrence, or a combination thereof. In some examples, functionalities described herein in relation to FIG. 5 may be provided in combination with functionalities described herein in relation to any of FIGS. 1-4.

What is claimed is:

1. A non-transitory machine-readable storage medium encoded with instructions executable by a processing resource of a computing device to:
   access, over a network without going through a proxy server, network traffic exchanged between a client system and a web server application;
   identify, in the accessed network traffic, an analysis reporting message generated by a client system, wherein the analysis reporting message includes information representing a client system analysis of at least one transaction between the client system and at least one of a web server application implementing a website, and a proxy server associated with the web server application; and
   extract, from the analysis reporting message in the accessed network traffic, information representing a client system analysis of at least one prior transaction between the client system and a proxy server associated with the web server application,
   wherein the information representing the client system analysis comprises information describing an experience of the client system, including an indication of an amount of time to perform the at least one prior transaction between the client system and the proxy server.

2. The storage medium of claim 1, wherein the instructions to identify the analysis reporting message comprise instructions to:
   identify, as the analysis reporting message, a message in the accessed network traffic sent to an analysis reporting uniform resource locator (URL) of the web server application.

3. The storage medium of claim 2, further comprising instructions to:
   identify another message in the accessed network traffic sent to another URL of the web server application as a non-reporting message; and
   analyze the non-reporting message in relation to other messages of the accessed network traffic to generate information representing network traffic analysis.

4. The storage medium of claim 1, wherein:
   the at least one prior transaction between the client system and the proxy server comprises downloading, from the proxy server to the client system, content of the website implemented by the web server application, wherein the content is cached at the proxy server, and
   wherein the amount of time to perform at least one prior transaction between the client system and the proxy server is an amount of time to download the content from the proxy server to the client system.

5. The storage medium of claim 1, wherein the web server application receives the analysis reporting message from the client system and acknowledges the analysis reporting message, without further processing by the web server application.

6. A system comprising:
a processor; and
a non-transitory machine-readable storage medium storing machine-readable instructions that are executable by the processor to:
access, over a network without going through a proxy server, network traffic exchanged between a client system and a web server application;
identify, as an analysis reporting message generated by a client system, a message in the accessed network traffic sent to an analysis reporting uniform resource locator (URL) of the web server application, wherein the analysis reporting message includes information representing a client system analysis of at least one transaction between the client system and at least one of a web server application implementing a website, and a proxy server associated with the web server application;
extract, from the analysis reporting message in the accessed network traffic, information representing a client system analysis of at least one prior transaction associated with a request of the client system targeting another URL of the web server application;
identify another message in the accessed network traffic sent to another URL of the web server application as a non-reporting message; and
analyze the non-reporting message in relation to other messages of the accessed network traffic to generate information representing network traffic analysis.

7. The system of claim 6, wherein the web server application receives the analysis reporting message from the client system and acknowledges the analysis reporting message, without further processing by the web server application.

8. The system of claim 6, wherein the at least one prior transaction comprises at least one prior transaction between the client system and a proxy server associated with the web server application.

9. The system of claim 8, wherein the proxy server is at least one server of a content delivery network (CDN).

10. The system of claim 9, wherein the processor is to:
identify the message in accessed network traffic exchanged between the web server application and the proxy server.

11. The system of claim 6, wherein the information representing the client system analysis comprises information describing a subject matter of the at least one prior transaction.

12. A method comprising:
sniffing, over a network without going through a proxy server with a probe system, network traffic exchanged between a client system and a web server application;
identifying, in the network traffic, an analysis reporting message generated by a client system, wherein the analysis reporting message includes information representing a client system analysis of at least one transaction between the client system and at least one of a web server application implementing a website, and a proxy server associated with the web server application;
parsing the analysis reporting message in the network traffic with the probe system, the analysis reporting message including information representing a client system analysis of at least one prior transaction between the client system and a proxy server associated with the web server application; and
providing the information representing the client system analysis from the probe system to a data aggregator,
wherein the information representing the client system analysis comprises information describing an experience of the client system including an indication of an amount of time to perform the at least one prior transaction between the client system and the proxy server.

13. The method of claim 12, wherein the web server application receives the analysis reporting message from the client system and acknowledges the analysis reporting message, without further processing by the web server application.

14. The method of claim 12, wherein the identifying comprises:
determining whether a message in the network traffic is targeting an analysis reporting uniform resource locator (URL) of the web server application; and
if the message is targeting the analysis reporting URL, identifying the message as the analysis reporting message.

15. The method of claim 14, further comprising:
if the message is not targeting the analysis reporting URL, analyzing the message in association with other messages of the network traffic to generate information representing a network traffic analysis; and
providing the information representing the network traffic analysis from the probe system to the data aggregator.

* * * * *